United States Patent [19]

Beier

[11] 4,009,383
[45] Feb. 22, 1977

[54] LIGHT CHUTE ARRANGEMENT
[75] Inventor: Siegfried Beier, Munich, Germany
[73] Assignee: AGFA-Gevaert A.G., Leverkusen, Germany
[22] Filed: Oct. 22, 1975
[21] Appl. No.: 624,977
[30] Foreign Application Priority Data
Oct. 31, 1974 Germany ............... 2451892
[52] U.S. Cl. ............... 240/1.3; 240/44.1; 355/67
[51] Int. Cl.² ............... G03B 15/02; G03B 27/54
[58] Field of Search ............ 240/1.3, 44.1, 46.03, 240/46.05, 46.13, 46.23; 355/67, 71
[56] References Cited
UNITED STATES PATENTS

| 2,768,284 | 10/1956 | Woolley | 240/1.3 |
|---|---|---|---|
| 3,684,371 | 8/1972 | Weisglass | 355/71 |
| 3,874,792 | 4/1975 | Turner | 355/67 |

Primary Examiner—L. T. Hix
Assistant Examiner—J. A. LaBarre
Attorney, Agent, or Firm—Michael J. Striker

[57] ABSTRACT

A light chute arrangement used in photographic copying apparatus for conveying light from a light source to a negative comprises a first light chute component having an open side and at least one further light chute component, each of said light chute components having reflective inner surfaces. The further light chute component is mounted for movement into and out of the interior of the first light chute component to selectably form from the light chute components light chutes of different respective cross-sections adapted to convey light to negatives of different respective sizes.

10 Claims, 2 Drawing Figures

LIGHT CHUTE ARRANGEMENT

BACKGROUND OF THE INVENTION

The invention relates to a photographic copying apparatus and, more particularly, to such an apparatus having a light chute arrangement of the type having reflective inner surfaces for conveying light from a light source to an original.

Light chutes are essentially compartments which convey light in a path from a light source to an original, i.e., an object to be illuminated, such as a negative. Such light chutes have been utilized in color copier apparatus to convey the variously-colored, filtered light components from their respective light sources to illuminate a negative. The light chute receives and mixes various light components and serves to uniformly distribute the latter over the entire area of the negative.

Difficulties have arisen in the optimal illumination of negatives of different respective sizes. In order to illuminate each of the differently-sized negatives with maximum intensity, it is necessary to provide a light chute having a correspondingly-sized cross-section.

The prior art has attempted to present different cross-sectioned light chutes for the different sizes of respective negatives. Thus, it is known to arrange a sliding carriage having a plurality of light chutes which are each respectively displaceable into the light path. However, this approach has the disadvantage that it requires a comparatively large amount of space. This prior art approach takes up a great deal of room since it must accommodate all possible positions of the sliding carriage.

In addition, the prior art has proposed a light chute arrangement in which the walls of an initially large-sized chute are each partially displaced inwardly towards each other in order to form a smaller-sized cross-section. However, this latter approach have the disadvantage that it requires all four walls to be moved. Thus, each of the walls must be separately positioned which means that this arrangement requires a complicated mechanism to move each of the respective walls. This latter prior art approach also suffers from the disadvantage that the number of possible cross-sections is limited.

SUMMARY OF THE INVENTION

Accordingly, it is the general object of the present invention to overcome the disadvantages of the prior art.

More particularly, it is an object of the present invention to provide a light chute arrangement which requires a relatively small amount of space.

An additional object of the present invention is to provide a light chute arrangement which eliminates the necessity of moving each of the walls of a light chute.

Still another object of the present invention is to provide a simple arrangement which adjusts the cross-section of a light chute to convey light to objects to be illuminated of different respective sizes.

In keeping with these objects and others which will become apparent hereinafter, one feature of the invention is embodied in a combination in a light chute arrangement of the type having reflective inner surfaces for conveying light from a light source to an original, which comprises a first light chute component having an open side and at least one further light chute component, each light chute component having reflective inner surfaces. In addition, mounting means for mounting said at least one further light chute component for movement into and out of the interior of the first light chute component is provided to selectably form from the light chute components light chutes of different respective cross-sections adapted to convey light to originals of different respective sizes.

This feature overcomes the drawbacks of the prior art mentioned and achieves the aforementioned objects in a novel manner.

Another feature of the invention is to protect the reflective inner surfaces of the light chute arrangement from being scratched during the movement of the various light chute components. Bearing guides are respectively provided on the side walls of each light chute component which is moved into and out of the interior of another light chute component which, in turn, has a flange portion on its side walls. The respective bearing guides engage the respective flange portions and urge the side walls thereof outwardly so as to prevent the reflective inner surfaces provided thereon from being marred during the movement of the various light chute components.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
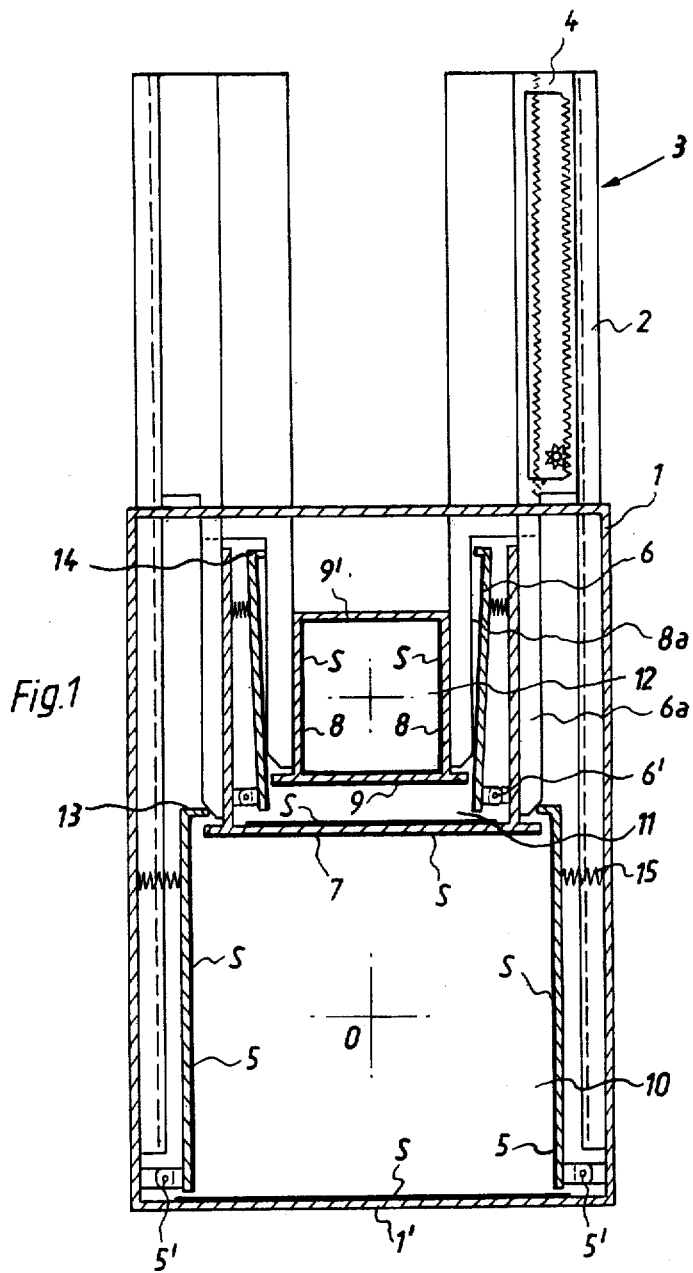
FIG. 1 is a view in cross-section of an exemplary embodiment of the light chute arrangement in which the largest cross-sectioned light chute component has been selected.

Referring initially to FIG. 1 of the drawing, it will be seen that reference numeral 1 identifies a dusttight, sealed housing 1 which contains the light chute components. Mounting means 3 comprises a longitudinal telescopictype track 2 or rail for guiding the movement of the geared rack 4 which, in turn, moves the different light chute components into position with respect to the optical axis O. The light which is conveyed from a light source to an original, i.e. an object to be illuminated, such as a negative, travels in a path in the direction of the optical axis O.

Figure 2:
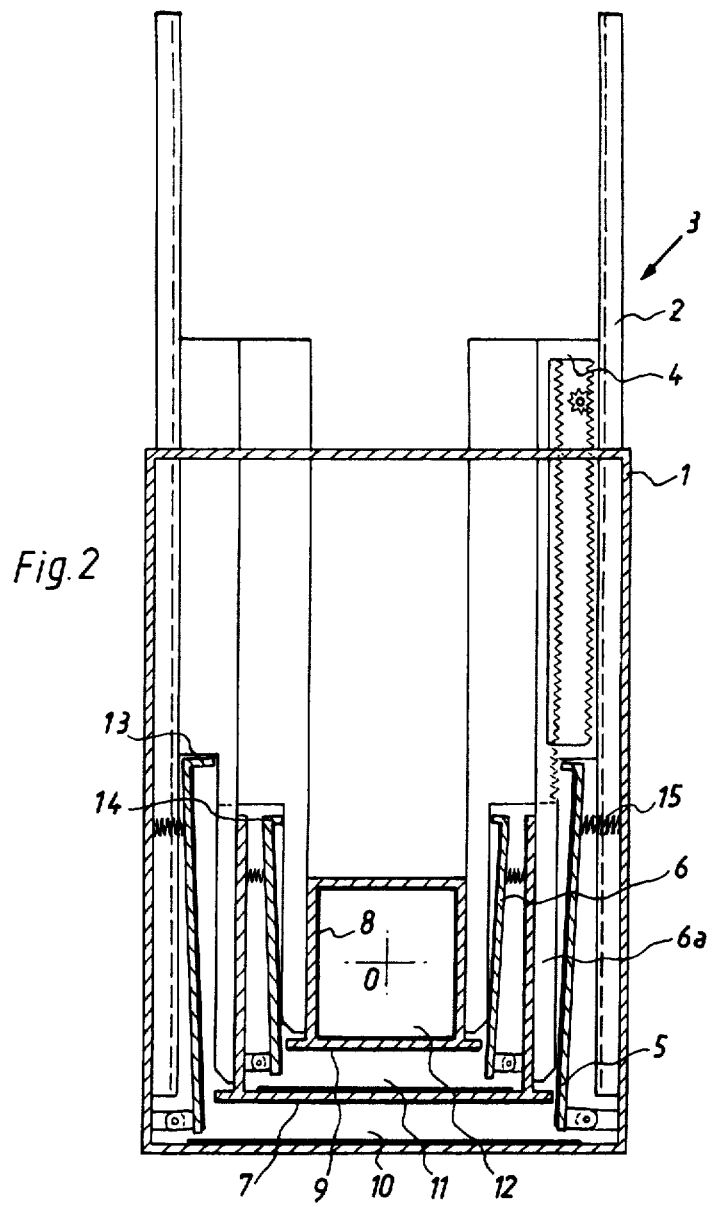
FIG. 2 is a view in cross-section of the embodiment of FIG. 1 in which the smallest cross-sectioned light chute component has been selected.

The exemplary embodiment illustrated in FIGS. 1 and 2 of the drawing shows a light chute arrangement comprised of three light chute components, namely light chute components 10, 11 and 12. It is to be expressly understood that the arrangement is not intended to be limited to three such components, since it is also intended to include a much greater number of such light chute components. Evidently, the light chute arrangement may also comprise only two light chute components.

A first light chute component 10 is generally U-shaped and has an open side. The closed side is identified by reference numeral 1' which is the base wall of the housing 1. The lower regions of the side walls 5 of the first light chute component 10 are pivotally mounted to the lower region of the housing 1 at pivot points 5'. The upper regions of the side walls 5 have flange portions 13 which respectively project inwardly in part towards each other. The dimensions of the U-shaped first light chute component 10 is selected so that it presents the largest cross-section for conveying light to an original.

A further light chute component has smaller dimensions than the first light chute component 10 so that it can move into and out of the interior of the latter via the open side thereof. In the three-stage light chute arrangement illustrated in FIG. 1, the further light chute component 11 is generally U-shaped and also has an open side. Light chute component 11 has a base wall 7 which overlies the open side of light chute component 10 so as to form a closed compartment therewith for light to pass through, and side walls 6 which, at their lower region, are pivotally connected at pivot points 6' to the mounting means 3 and, at their upper region, have flange portions 14.

Finally, light chute compartment 12 has side walls 8 and base wall 9, which overlies the open end of light chute compartment 11, and has the smallest cross-section of any of the previously described light chute compartments. Since light chute compartment 12 is the last stage in this purely exemplary embodiment, it is not U-shaped but is itself a closed compartment having a top wall 9'. Light chute compartment 12 is also mounted on the mounting means 3 to move into and out of the respective interiors of light chute compartments 11 and 10.

All of the inner surfaces of each of the compartments 10, 11 and 12 have reflective inner surfaces which are identified in the drawing by the reference character S. These inner surfaces 12 are coated with a layer of reflective material, such as is commonly found on mirrors and the like; alternatively, the inner surfaces 12 may be comprised of a diffusing reflective material.

In operation, the movement of the light chute components by the mounting means 3 is controlled either by manual or by motorized means. Depending upon the size of the original to be illuminated by a light source, an operator will select and position the light chute component having the proper cross-section to illuminate the entire area of the original. Thus, in FIG. 1, the largest cross-sectioned component 10 is positioned to be aligned with the optical axis O; whereas, in FIG. 2, the smallest cross-sectioned component 12 is positioned to be aligned with the optical axis O.

During the movement of the light chute components, it is desirable to prevent the reflective inner surfaces S from being scraped or damaged in any way. Thus, bearing members 6a lying outwardly of the side walls 6 of the light chute component 11 will engage the flange portions 13 of the side walls 5 of the light chute component 10 and displace the side walls 5 outwardly against the restoring force of the springs 15. The bearing members 6a thus maintain the side walls 6 and the base wall 7 of the light chute component 11 from engaging and thereby scraping the inner reflective surfaces S of the side walls 5 of the light chute component 10.

In a similar manner, bearing members 8a of light chute component 12 cooperate with flange portions 14 of light chute component 11 to prevent the reflective inner surfaces S of light chute component 11 from being damaged.

The light chute arrangement, thus described, is particularly useful in photo-copier applications. As compared with the prior art light chutes, a comparatively lesser amount of room is taken up by the collapsible-type arrangement in the interior of the copier leaving the regions laterally and in front of the original free for other purposes.

The cross-sections of each of the light chutes may have any outline; for example, any rectangular, square or generally quadrilateral shape. As noted above, any number of light chute components may be utilized in the arrangement.

It will be understood that each of the elements described above, or two or more together, may also find a useful application in other types of constructions differing from the types described above.

While the invention has been illustrated and described as embodied in a light chute arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A light chute arrangement of the type having reflective inner surfaces for conveying light from a light source to an original, comprising, in combination, a first light chute component having a generally U-shaped outline with one open side; at least one further light chute component, each of said light chute components having reflective inner surfaces; and mounting means for mounting said at least one further light chute component for movement into and out of the interior of the first light chute component to selectably form from said light chute components light chutes of different respective cross-sections adapted to convey light to originals of different respective sizes.

2. A light chute arrangement of the type having reflective inner surfaces for conveying light from a light source to an original, comprising, in combination, a first light chute component having an open side and side walls laterally opposite said open side, said side walls having a lower region and being mounted at said lower region for pivotal movement about an axis substantially parallel to the light path, and an upper region having flange portions which extend towards each other; at least one further light chute component, each of said light chute components having reflective inner surfaces; and mounting means for mounting said further light chute component for movement into and out of the interior of the first light chute component to selectably form from said light chute components light chutes of different respective cross-sections adapted to convey light to originals of different respective sizes.

3. A combination as defined in claim 2; and further comprising bearing members on said at least one further light chute component for engaging said flange portions on said first light chute component during the movement into and out of the interior of the latter and maintaining said side walls of said at least one further light chute component out of physical contact with said side walls of said first light chute component.

4. A light chute arrangement of the type having reflective inner surfaces for conveying light from a light source to an original, comprising, in combination, a first light chute component having an open side; at least one further light chute component having an open side and side walls laterally opposite said open side, said side walls having a lower region and being mounted at said lower region for pivotal movement about an axis substantially parallel to the light path, and an upper region having flange portions which extend towards each other; an additional light chute component, the cross-section of said additional light chute component being smaller than the cross-section of said further light chute component which, in turn, is smaller than the cross-section of said first light chute component, each of said light chute components having reflective inner surfaces; and mounting means mounting said further light chute component for movement into and out of the interior of said first light chute component, and said additional light chute component for movement into and out of said further light chute component to selectably form from said light chute components light chutes of different respective cross-sections adapted to convey light to originals of different respective sizes.

5. A combination as defined in claim 4; and further comprising bearing members on said additional light chute component for engaging said flange portions on said at least one further light chute component during the movement into and out of the interior of the latter and maintaining said side walls of said additional light chute component out of physical contact with said side walls of said at least one further light chute component.

6. A light chute arrangement of the type having reflective inner surfaces for conveying light in one direction from a light source to an original, comprising, in combination, a first light chute component having an open side; at least one movable further light chute component, each of said light chute components having relfective inner surfaces; and mounting means for mounting said further light chute component movable translationally in a second direction transverse to said one direction into and out of the interior of said first light chute component so as to selectably form from said light chute components light chutes of different respective cross-sections adapted to convey light to originals of different respective sizes.

7. A combination as defined in claim 6; and further comprising a dust-tight housing enclosing said light chute components in all of their respective positions during said movement into and out of the interior of said first light chute component.

8. A combination as defined in claim 6, wherein said at least one further light chute component has a closed side which overlies and is receivable into said open side of said first light chute component, said closed side having reflective surfaces on its opposite surfaces.

9. A combination as defined in claim 6, wherein said at least one further light chute component has a generally quadrilateral outline having a cross-section which is smaller than the cross-section of said first light chute component.

10. A combination as defined in claim 6, wherein said at least one further light chute component has an open side; and further comprising an additional light chute component mounted for movement into and out of the interior of the open side of said at least one further light chute component, the cross-section of said additional light chute component being smaller than the cross-section of said at least one further light chute component which is, in turn, smaller than the cross-section of said first light chute component.

* * * * *